United States Patent
Hartmann et al.

(10) Patent No.: US 10,177,582 B2
(45) Date of Patent: Jan. 8, 2019

(54) METHOD FOR CONNECTING THE CELLS OF A BATTERY, AND ASSOCIATED BATTERY SYSTEM

(71) Applicant: Robert Bosch GmbH, Stuttgart (DE)

(72) Inventors: Philipp Hartmann, Stuttgart (DE); Philipp Hillenbrand, Neuffen (DE)

(73) Assignee: Robert Bosch GmbH, Stuttgart (DE)

(*) Notice: Subject to any disclaimer, the term of this patent is extended or adjusted under 35 U.S.C. 154(b) by 46 days.

(21) Appl. No.: 15/327,877

(22) PCT Filed: Jun. 30, 2015

(86) PCT No.: PCT/EP2015/064812
§ 371 (c)(1),
(2) Date: Jan. 20, 2017

(87) PCT Pub. No.: WO2016/012202
PCT Pub. Date: Jan. 28, 2016

(65) Prior Publication Data
US 2017/0214255 A1    Jul. 27, 2017

(30) Foreign Application Priority Data
Jul. 23, 2014    (DE) ........................ 10 2014 214 319

(51) Int. Cl.
*H02J 7/00* (2006.01)
*B60L 3/12* (2006.01)
(Continued)

(52) U.S. Cl.
CPC .............. *H02J 7/0021* (2013.01); *B60L 3/12* (2013.01); *B60L 11/1855* (2013.01);
(Continued)

(58) Field of Classification Search
CPC ...... H02J 7/0021; H02J 7/007; H01M 2/1077; H01M 10/441; H01M 10/482;
(Continued)

(56) References Cited

U.S. PATENT DOCUMENTS

2010/0261043 A1    10/2010    Kim et al.
2013/0138369 A1    5/2013    Papana et al.
(Continued)

FOREIGN PATENT DOCUMENTS

CN    102656469 A    9/2012
CN    103020445    4/2013
(Continued)

OTHER PUBLICATIONS

International Search Report for Application No. PCT/EP2015/064812 dated Sep. 24, 2015 (English Translation, 3 pages).
(Continued)

*Primary Examiner* — Naum B Levin
(74) *Attorney, Agent, or Firm* — Michael Best & Friedrich LLP

(57) ABSTRACT

A method for connecting a plurality of battery cells of a battery, wherein the battery cells are each electrically coupled to the battery with a corresponding first probability and are each electrically decoupled from the battery with a corresponding second probability. A first quality factor is calculated for each battery cell depending on a state of charge and on a state of ageing of the corresponding battery cell. An average first quality factor, corresponding to an average value of the first quality factors of the battery cells, is also determined. A second quality factor is calculated for each battery cell as a function of the difference between the first quality factor of the corresponding battery cell and the average first quality factor. The first probability and the second probability are determined for each battery cell based
(Continued)

on the second quality factor of the corresponding battery cell.

17 Claims, 2 Drawing Sheets

(51) Int. Cl.
| | |
|---|---|
| *B60L 11/18* | (2006.01) |
| *H01M 10/42* | (2006.01) |
| *H01M 10/44* | (2006.01) |
| *H01M 10/48* | (2006.01) |
| *H01M 2/10* | (2006.01) |
| *H01M 10/0525* | (2010.01) |

(52) U.S. Cl.
CPC ....... *B60L 11/1866* (2013.01); *H01M 2/1077* (2013.01); *H01M 10/0525* (2013.01); *H01M 10/425* (2013.01); *H01M 10/441* (2013.01); *H01M 10/482* (2013.01); *H02J 7/007* (2013.01); *H02J 7/0014* (2013.01); *B60L 2240/547* (2013.01); *B60L 2260/42* (2013.01); *B60L 2260/44* (2013.01); *H01M 2010/4271* (2013.01); *H01M 2010/4278* (2013.01); *H01M 2220/20* (2013.01); *Y02T 10/7005* (2013.01); *Y02T 10/7061* (2013.01)

(58) Field of Classification Search
CPC ..... H01M 10/0525; H01M 2010/4271; H01M 2010/4278; H01M 2220/20; B60L 2240/547; B60L 11/1866
See application file for complete search history.

(56) References Cited

U.S. PATENT DOCUMENTS

| | | | |
|---|---|---|---|
| 2014/0015488 A1 | 1/2014 | Despesse | |
| 2015/0165919 A1* | 6/2015 | Hughes | B60L 11/1857 320/109 |
| 2016/0099488 A1* | 4/2016 | Hillenbrand | H01M 10/4257 429/50 |
| 2017/0232863 A1* | 8/2017 | Friedrich | B60L 11/1866 320/134 |

FOREIGN PATENT DOCUMENTS

| | | |
|---|---|---|
| DE | 102011002548 | 7/2012 |
| DE | 102011075376 | 11/2012 |

OTHER PUBLICATIONS

Jeda, J. et al., "A broadcast-probability approach to the control of vast DOF cellular actuators," 2006 IEEE International, Conference on Robotics and Automation (ICRA): Orlando, Florida, May 15-19, 2006, IEEE Operations Center, Piscataway, NY, May 15, 2006, pp. 1456-1461, XP010921476.

* cited by examiner

US 10,177,582 B2

METHOD FOR CONNECTING THE CELLS OF A BATTERY, AND ASSOCIATED BATTERY SYSTEM

BACKGROUND OF THE INVENTION

The present invention relates to a method for connecting a plurality of battery cells of a battery designed as an electrochemical energy store. The invention also relates to a battery system with a battery designed as an electrochemical store with a plurality of battery cell units which in each case comprise a battery cell and a battery cell monitoring module allocated to the battery cell.

FIG. 1 shows a battery system 10 known from the prior art which comprises a battery 11 with a plurality of battery cell units (Smart Cell Unit SCU) 20 which in each case have a battery cell 21 and a battery cell monitoring module (battery cell electronic module or battery cell electronics) 22 allocated to the battery cell 21. In order to simplify the illustration from FIG. 1, only two battery cells have been drawn and denoted in each case with the reference number 20. The battery cell monitoring modules 22 enable an individual control of the individual battery cells 21. In order to generate an output voltage (total output voltage) U of the battery 11, which also serves as the output voltage U of the battery system 10, the battery cell monitoring modules 22 are interconnected in a series circuit via a connection path. The battery system 10 furthermore comprises a Central Control Unit (CCU) 30 to control the battery system 10.

In order to generate a controlled output voltage (total output voltage) U of the battery 11, individual battery cells 21 are activated in each case by means of the allocated battery cell monitoring module 22, i.e. the battery cells 21 can be incorporated into the series circuit in each case in positive or negative polarity relative to the tap of the output voltage U of the battery 11. In order to generate a controlled output voltage (total output voltage) U of the battery 11, individual battery cells 21 are furthermore deactivated in each case by means of the allocated battery cell monitoring module 22, i.e. the battery cells 21 to be deactivated are disconnected from the series circuit by electrically connecting the connection terminals of each battery cell 21 that is to be deactivated by means of the allocated battery cell monitoring module 22, whereby the corresponding battery cells 21 are bypassed. The battery cells 21 connected to the series circuit can consequently in each case be in a switching state referred to as "positively connected" or in a further switching state referred to as "negatively connected". Furthermore, the battery cells 21 disconnected from the series circuit may be in a switching state referred to as "bypassed".

In battery systems 10 (SmartCell battery systems) of this type, the decision regarding the change of the switching state of the battery cells 21 is taken locally in the respective battery cell monitoring modules 22. The actual control function is implemented by the central control unit 30 which is designed as a central controller implemented at low cost.

In the battery system 10, a first control parameter P1 and a second control parameter P2 are specified via a communication path 31 designed as a one-way communication interface via which only a single message comprising the existing control parameters P1 and P2 is transmitted from the central control unit 30 to all battery cell monitoring modules 22. All battery cell monitoring modules 22 receive the same message and either autonomously connect the respectively allocated battery cells 21 to the series circuit or bypass the respectively allocated battery cells 21 by means of the corresponding switches (not shown) present in each case in the battery cell monitoring modules 22. According to a control algorithm, the central control unit 30 specifies the two control parameters P1, P2 in the form of two numerical values between 0 and 1 which are transmitted via the communication path 31 from the central control unit (CCU) 30 to the battery cell monitoring modules (SCU) 22 and are likewise received by all battery cell monitoring modules 22. Here, $0 \leq P1 \leq 1$ and $0 \leq P2 \leq 1$ apply.

In each battery cell monitoring module 22, an equally distributed random process is carried out which interprets P1 as a first probability referred to as the activation probability with which each deactivated battery cell 21 will be activated, and P2 is interpreted as a second probability referred to as the deactivation probability with which each activated battery cell will be deactivated. The central control unit 30 tracks the control parameters P1 and P2 so that the smallest possible difference (control difference) occurs between an existing output voltage U of the battery 11 and a desired output voltage Us of the battery 11.

In addition to the generation of a controlled output voltage U of the battery 11, a simple extension of the control algorithm executed by the central control unit 30 can be performed in such a way that an active battery cell functional state balancing (battery cell balancing) is achieved through the simultaneous use of a weighted usage duration for the battery cells 21.

To do this, each battery cell monitoring module 22 scales the relevant control parameter P1 or P2, i.e. the identically received control parameter P1 or P2 selected depending on the switching state of the allocated battery cell 21, depending on a quality factor which is calculated depending on a state of charge (SOC) and a state of health (SOH) of the allocated battery cell 21. As a result, deactivated battery cells 21 with a higher quality factor are activated during a discharging process with a higher probability than battery cells 21 with a lower (lesser) quality factor. Conversely, battery cells 21 with a lower quality factor are deactivated during a discharging process with a higher probability than battery cells 21 with a higher quality factor. On average over time, battery cells 21 with a lower quality factor are less frequently drained, as a result of which an active battery cell functional state balancing of the battery cells 21 is achieved.

In the implementation of the battery cell functional state balancing method described above, it has emerged that a battery cell functional state balancing can be achieved only if the quality factors of the battery cells 21 differ significantly from one another. If a battery cell functional state balancing method depending on the states of charge of the battery cells 21 is used, the effect of a battery cell functional state balancing carried out in this way with the occurrence of state of charge differences between the battery cells 21 which are less than 5% is then barely recognizable. Through the use of a statistical control algorithm (regulation algorithm) as described above, the battery cells 21 are drained depending on the statistical fluctuation. Investigations to date have shown that this effect is predominant in the hitherto used battery cell state balancing method. As a result, the states of charge of the battery cells 21 of a battery 11 of a battery system 10 known from the prior art always differ from one another in the range from 0 to 5%.

SUMMARY OF THE INVENTION

According to the invention, a method is provided for connecting a plurality of battery cells of a battery designed as an electrochemical energy store. The battery cells are electrically coupled to the battery in each case with a corresponding first probability and are electrically decoupled from the battery in each case with a corresponding second probability. The battery cells are interconnectable in series. In the method, a first quality factor is calculated for each battery cell depending on a state of charge and on a state of health of the corresponding battery cell. An average first quality factor which corresponds to an average value of the first quality factors of the battery cells is furthermore defined. A second quality factor is also calculated for each battery cell as a linear, in particular monotonically increasing function of the difference between the first quality factor of the corresponding battery cell and the average first quality factor. The corresponding first probability and the corresponding second probability are defined in each case for each battery cell depending on the calculated second quality factor of the corresponding battery cell.

According to the invention, a battery system with a battery designed as an electrochemical energy store with a plurality of battery cell units is furthermore provided, in each case comprising a battery cell and a battery cell monitoring module allocated to the battery cell. Each battery cell monitoring module is designed to couple the allocated battery cell electrically to the battery with a corresponding first probability and decouple it electrically from the battery with a corresponding second probability. The battery cells are interconnectable in series by means of the allocated battery cell monitoring modules. Furthermore, each battery cell monitoring module is designed to calculate a first quality factor of the allocated battery cell depending on a state of charge and a state of health of the corresponding battery cell. The battery system furthermore comprises a central control unit which is designed to define an average first quality factor which corresponds to an average value of the first quality factors of the battery cells and to transmit it to each battery cell monitoring module. Each battery cell monitoring module is furthermore also designed to calculate a second quality factor of the allocated battery cell as a linear, in particular monotonically increasing function of the difference between the first quality factor of the corresponding battery cell and the average first quality factor and to define the corresponding first probability and the corresponding second probability in each case depending on the calculated second quality factor of the allocated battery cell.

In the invention, an average first quality factor (a mean first quality factor of all participating battery cells) is defined and transmitted from the central control unit to all battery cell monitoring modules which in each case calculate a second quality factor depending on the first quality factor of the allocated battery cell and on the received average first quality factor.

The second quality factor $G2i$ is preferably defined for each battery cell according to the relation (1):

$$G2i = ((G1i - G1)/C) + 0.5,$$

wherein C is an, in particular, positive constant, $$0 \leq G1i \leq 1, 0 \leq G1 \leq 1 \text{ and } 0 \leq G2i \leq 1 \text{ in particular}$$
$$0.1 \leq G2i \leq 0.9. \quad (1)$$

In the relation (1), C is an, in particular, positive constant, i is a natural number between 1 and a number n of the battery cells of the battery, $G2i$ is the second quality factor of the i-th battery cell, $G1i$ is the first quality factor of the corresponding i-th battery cell and $G1$ is the average first quality factor which corresponds to the average value of the first quality factors of the battery cells of the battery. If C is a positive constant in the relation (1), the second quality factor of each battery cell is a linear, monotonically increasing function of the difference between the first quality factor of the corresponding battery cell and the average first quality factor.

In a particularly preferred embodiment of the invention, during a discharging process of the battery, the corresponding first probability for each battery cell is a linear, monotonically increasing function of the second quality factor of the corresponding battery cell, and the corresponding second probability for each battery cell is a linear, monotonically decreasing function of the second quality factor of the corresponding battery cell. Preferably, during a charging process of the battery, the corresponding first probability for each battery cell is a linear, monotonically decreasing function of the second quality factor of the corresponding battery cell, and the corresponding second probability for each battery cell is a linear, monotonically increasing function of the second quality factor of the corresponding battery cell.

Preferably, during a discharging process of the battery, each battery cell electrically decoupled from the battery, i.e. each deactivated battery cell, is electrically coupled to the battery, i.e. is activated, with a first probability which is a monotonically increasing function of the second quality factor of the corresponding battery cell, and each activated battery cell is deactivated with a corresponding second probability which is a monotonically decreasing function of the second quality factor of the corresponding battery cell. More preferably, during a charging process of the battery, each deactivated battery cell is activated with a first probability which is a monotonically decreasing function of the second quality factor of the corresponding battery cell, and each activated battery cell is deactivated with a corresponding second probability which is a monotonically increasing function of the second quality factor of the corresponding battery cell. This means that, during a discharging process of the battery, battery cells with greater second quality factors can be discharged more strongly than battery cells with smaller second quality factors. This furthermore means that, during a discharging process of the battery, battery cells with smaller second quality factors can be charged more strongly than battery cells with greater second quality factors.

The second quality factor of each battery cell is a monotonically increasing function of the difference between the first quality factor of the corresponding battery cell and the average first quality factor and, during a discharging process of the battery, for each battery cell, the first corresponding first probability is a monotonically increasing function and the second corresponding second probability is a monotonically decreasing function of the second quality factor of the corresponding battery cell. It is thereby achieved that, during a discharging process of the battery, battery cells which have a first quality factor of which the difference $G1i-G1$ is greater, are more often activated and less often deactivated, i.e. are more strongly discharged, than battery cells which in each case have a first quality factor of which the difference $G1i-G1$ is smaller.

The second quality factor of each battery cell is a monotonically increasing function of the difference between the first quality factor of the corresponding battery cell and the average first quality factor and, during a charging process of the battery, for each battery cell, the corresponding first probability is a monotonically decreasing function and the corresponding second probability is a monotonically increasing function of the second quality factor of the corresponding battery cell. It is thereby achieved that, during a charging process of the battery, battery cells which have a first quality factor of which the difference $G1i-G1$ is smaller, are more often activated and less often deactivated, i.e. are more strongly charged, than battery cells which in each case have a first quality factor of which the difference G1i−G1 is greater.

The first quality factor of each battery cell is preferably a monotonically increasing function of the state of charge of the corresponding battery cell.

Consequently, a battery cell functional state balancing can be carried out according to the invention, by means of which even smaller state of charge differences between the battery cells of, for example, less than 5% can be effectively balanced.

In order to define the average first quality factor, the average value of the first quality factors of the battery cells is preferably calculated from the values of the first quality factors of the battery cells. In this definition of the average first quality factor, the calculated value for the first quality factor of each battery cell is preferably transmitted by means of the corresponding battery cell monitoring module to the central control unit which then calculates the average value of the first quality factors of the battery cells directly from the values of the first quality factors of the battery cells and transmits said average value to each battery cell monitoring module.

In particular, in order to define the average quality factor, the average value of the first quality factors of the battery cells can be specified in order to generate a desired output voltage of the battery. An existing output voltage of the battery is preferably measured. If an output voltage that is less than the desired output voltage is present, the average value of the first quality factors of the battery cells is preferably reduced during a discharging process of the battery and/or is increased during a charging process of the battery. If an existing output voltage that is greater than the desired output voltage is present, the average value of the first quality factors of the battery cells is more preferably increased during a discharging process of the battery and/or reduced during a charging process of the battery.

In the aforementioned definition of the average first quality factor, it is taken into account that the statistical mean value of the output voltage of the battery is influenced by the first probabilities with which the battery cells are activated, and by the second probabilities with which the battery cells are deactivated. Since the first probabilities and correspondingly also the second probabilities are dependent in each case on the second quality factor of the corresponding battery cell, and since the second quality factors of the battery cells are dependent in each case on the average first quality factor, the statistical mean value of the output voltage of the battery is dependent on the average first quality factor.

In the aforementioned definition, the measured existing output voltages and the desired output voltage are preferably not instantaneous values of the corresponding voltages, but rather average values of the corresponding voltages calculated over a plurality of control cycles, or statistical mean values of the corresponding voltages.

It is highly advantageous in the aforementioned definition of the average first quality factor that the battery cell modules do not have to transfer the respectively calculated value for the first quality factor of the respectively allocated battery cell to the central control unit. Here, the average first quality factor is initially estimated by the central control unit, is then iteratively approximated to the real value of the average first quality factor and is then transmitted to each battery cell module. The average first quality factor can thus be defined without any information flow between the battery cell monitoring modules and the central control unit.

For each battery cell, a first control parameter scaled with a first factor is preferably used as the corresponding first probability and a second control parameter scaled with a second scaling factor is used as the corresponding second probability. The first control parameter and the second control parameter are in each case independent from the first quality factor of the corresponding battery cell and from the second quality factor of the corresponding battery cell. The corresponding first factor and the corresponding second factor are also predefined in each case for each battery cell depending on the second quality factor of the corresponding battery cell.

For each battery cell, the sum of the corresponding first factor f1i and the corresponding second factor f2i is more preferably equal to 1. For each battery cell, the corresponding first factor may also be equal to the second quality factor of the corresponding battery cell during a discharging process of the battery. Furthermore, for each battery cell, the corresponding second factor may be equal to the second quality factor of the corresponding battery cell during a charging process of the battery.

The same first control parameter and the same second control parameter are preferably used for all battery cells.

In a particularly preferred embodiment of the invention, the first control parameter and the second control parameter are specified in order to generate a desired output voltage of the battery. An existing output voltage of the battery is preferably measured and compared with the desired output voltage of the battery. Furthermore, if there is a difference between the existing output voltage and the desired output voltage, the first control parameter and the second control parameter are modified in such a way that the amount of the difference between the existing output voltage and the desired output voltage is minimized. Here also, the measured existing output voltage and the desired output voltage are preferably not instantaneous values of the corresponding voltages, but rather average values of the corresponding voltages calculated over a plurality of regulation cycles or statistical mean values of the corresponding voltages.

The battery cells of a battery of a battery system according to the invention are preferably lithium-ion battery cells.

A further aspect of the invention relates to a vehicle with a battery system according to the invention.

BRIEF DESCRIPTION OF THE DRAWINGS

Example embodiments of the invention are described in detail below with reference to the accompanying drawings. The same reference numbers are also used for the same components. In the drawings.

DETAILED DESCRIPTION

Figure 1:
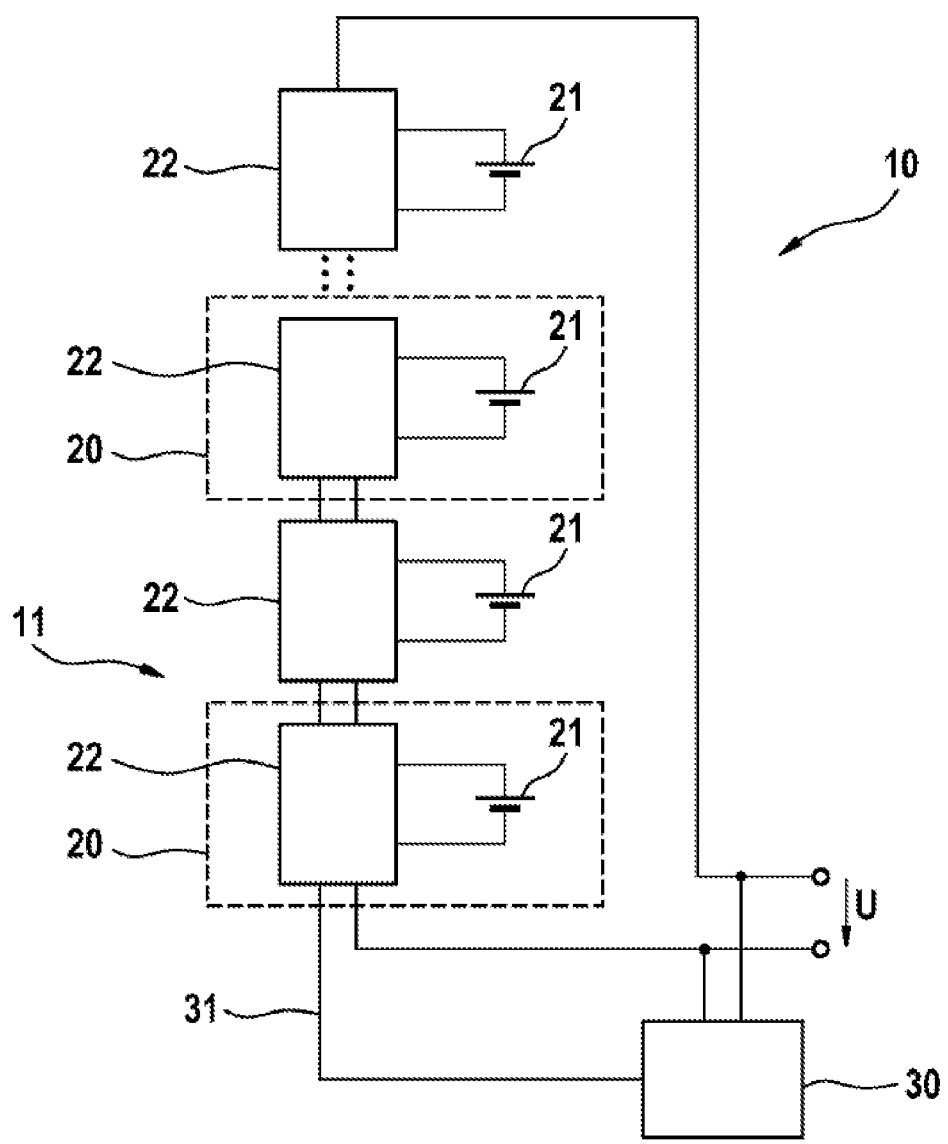
FIG. 1 shows a battery system known from the prior art.
Figure 2:
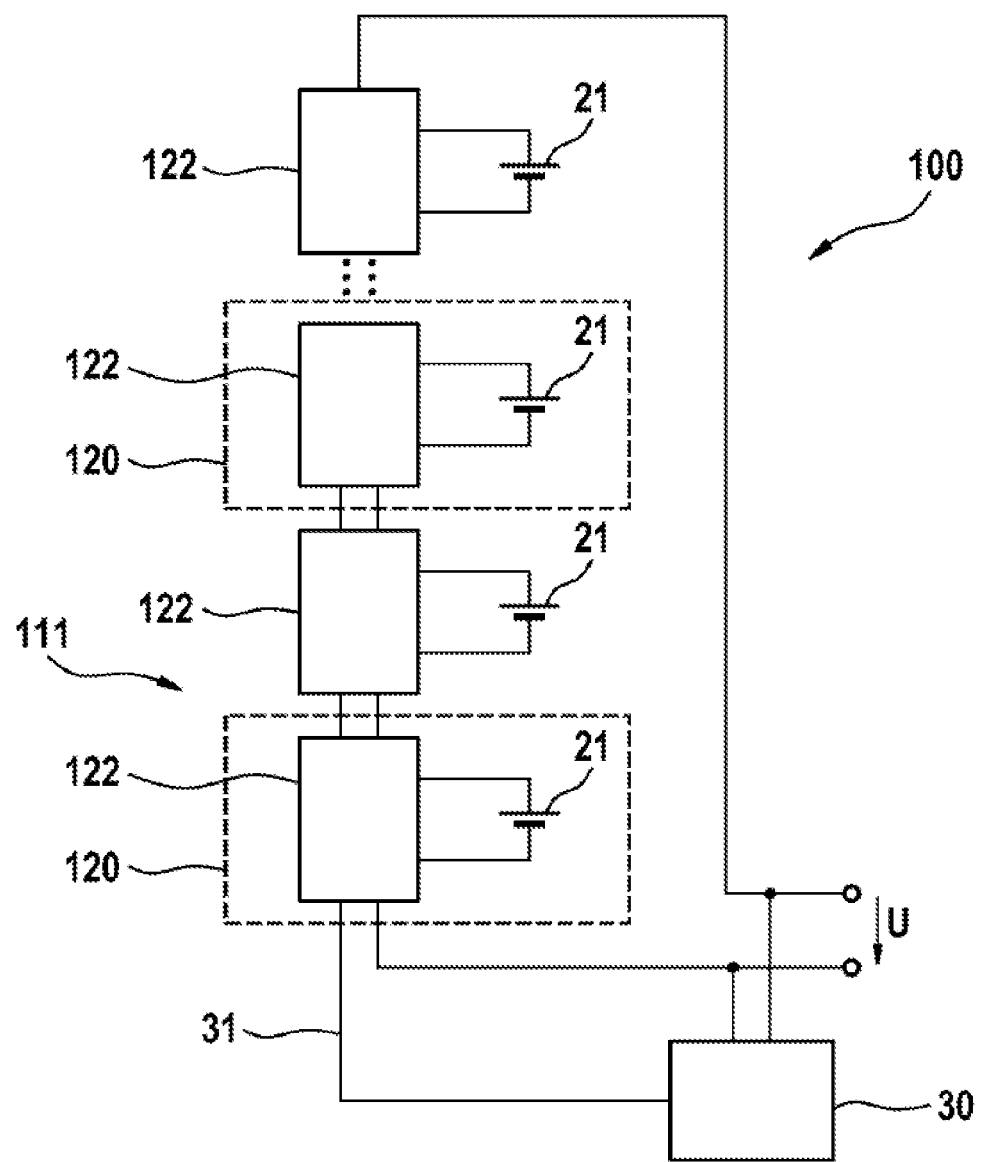
FIG. 2 shows a battery system according to a first embodiment of the invention.

FIG. 2 shows a battery system 100 according to the invention according to a first embodiment of the invention. As with the battery system shown in FIG. 1 and known from the prior art, the battery system 100 according to the invention comprises a battery 111 designed as an electrochemical energy store with a plurality of battery cell units 120 which in each case comprise a battery cell 21 and a battery cell monitoring module 122 allocated to the battery cell 21. In the battery system 100 according to the invention also, each battery cell monitoring module 122 is designed to activate the allocated battery cell 21, i.e. to couple it electrically to the battery 111, with a corresponding first probability P1i, and to deactivate it, i.e. decouple it electrically from the battery 111, with a corresponding second probability P2i. Furthermore, the battery cell units 122 of the battery system 100 according to the invention are also provided in such a way that, if the corresponding battery cells 21 are activated, they are interconnected in series, i.e. the activated battery cells 21 can in each case be incorporated here also into a series circuit in positive or negative polarity.

The battery system 100 according to the invention differs from the battery system shown in FIG. 1 in terms of the functionality of the battery cell monitoring modules 122 allocated to the battery cells 21. The battery cell monitoring modules 122 are designed to use a scaling of the control parameters P1 and P2 specified by the central control unit 30 which differs from the scaling of the battery cell monitoring modules of the battery system shown in FIG. 1. Consequently, the battery cell monitoring modules 122 according to the invention are also designed to define the corresponding first probabilities P1i with which the allocated battery cells 21 are in each case activated and the corresponding second probabilities P2i with which the allocated battery cells 21 are in each case deactivated differently from the second battery cell monitoring modules of the battery system shown in FIG. 1. A more effective battery cell functional state balancing of the battery cells 21 is thereby achieved. The functionality of each battery cell monitoring module 122 according to the invention is described in detail below.

Each battery cell monitoring module 122 according to the invention is designed to calculate a first quality factor G1i of the allocated battery cell 21 depending on a state of charge LZi and on a state of health AZi of the allocated battery cell 21. Each battery cell monitoring module 122 according to the invention is furthermore designed to calculate a second quality factor G2i of the allocated battery cell 21 according to the relation (1a) which represents a special case of the relation (1) already presented in the general description:

$$G2i=((G1i-G1)/C)+0.5,$$

wherein C is a positive constant, $$0 \leq G1i \leq 1, \ 0 \leq G1 \leq 1 \text{ and } 0 \leq G2i \leq 1 \text{ in particular}$$
$$0.1 \leq G2i \leq 0.9. \tag{1a}$$

In the relation (1a), i is a natural number between 1 and a number n of the battery cells 21 of the battery 111, G2i is the second quality factor of the i-th battery cell, G1i is the first quality factor of the corresponding i-th battery cell and G1 is the average first quality factor which corresponds to the average value of the first quality factors G1i of the battery cells 21 of the battery 111. As already mentioned above, the central control unit 30 is also designed in the case of the battery system 100 according to the invention to specify the first control parameter P1 and the second control parameter P2 and to transmit them to the battery cell monitoring modules 122 via the communication path 31.

Each battery cell monitoring module 122 according to the invention is furthermore designed to use the first control parameter P1 scaled with a corresponding first factor f1i as the corresponding first probability P1i and the second control parameter P2 scaled with a second factor f2i as the corresponding second probability P2i for the allocated battery cell 21.

Each battery cell monitoring module 122 according to the invention is designed to define a corresponding first probability P1i according to the relation (2) and a corresponding second probability P2i according to the relation (3) for the allocated battery cell 21 during a discharging process of the battery 111:

$$P1i=f1i \cdot P1=G2i \cdot P1 \tag{2}$$

$$P2i=f2i \cdot P2=(1-G2i) \cdot P2 \tag{3}.$$

Each battery cell monitoring module 122 according to the invention is also designed to define a corresponding first probability P1i according to the relation (4) and a corresponding second probability P2i according to the relation (5) for the allocated battery cell 21 during a charging process of the battery 111:

$$P1i=f1i \cdot P1=(1-G2i) \cdot P1 \tag{4}$$

$$P2i=f2i \cdot P2=G2i \cdot P1 \tag{5}.$$

In the relations (2) to (5), P1 is the first control parameter and P2 is the second control parameter, f1i is the corresponding first factor, f2i is the corresponding second factor and G2i is the corresponding second quality factor.

In summary, a significantly improved battery cell functional state balancing of the battery cells 21 of a battery is achieved even in the presence of smaller state of charge differences LZi between the battery cells 21, if a second quality factor G2i is calculated for each battery cell 21 depending on the average first quality factor G1 which corresponds to the average value of the first quality factors G1i of all battery cells 21 of the battery 111. An improved battery cell functional state balancing can be achieved, for example, by means of the calculation rule according to the relation (1a) in combination with the scaling of the received control parameters P1, P2 according to the relations (2), (3), (4), and (5). The smaller the constant C in the relation (1a), the stronger the effect of the battery cell functional state balancing carried out according to the invention. The constant C can therefore be selected in such a way that a significant effect of the battery cell functional state balancing carried out according to the invention is achieved even for small differences between the first quality factors G1i of the battery cells 21 of the battery 111.

In order to define the average first quality factor G1, the central control unit 30 is preferably designed to calculate the average value of the first quality factors G1i of all battery cells 21 of the battery 111 directly from the values of the calculated first quality factors G1i of the battery cells 21 transmitted by the battery cell monitoring modules 122 and to transmit the average first quality factor G1 defined in this way to the battery cell monitoring modules 122.

For the alternative definition of the average first quality factor G1, the average value of the first quality factors G1i of the battery cells 21 can be estimated by means of the central control unit 30 without any information flow from the battery cell monitoring modules 122, since the statistical mean value of the output voltage U of the battery 111 is influenced by the scaling of the received control parameter P1, P2 carried out according to the invention and is therefore dependent on the average first quality factor G1. For the implementation of a battery cell functional state balancing with the calculation rules shown in the relations (1a), (2), (3), (4) and (5), this means that, if the output voltage U of the battery 111 is less than a desired output voltage Us of the battery 111 during a discharging process of the battery 111, a value has been estimated for the average first quality factor G1 which is greater than the actual value of the average first quality factor G1, and that, if the output voltage U of the battery 111 is greater than a desired output voltage Us of the battery 111 during a discharging process of the battery 111, a value has been estimated for the average first quality factor G1 which is less than the actual value of the average first quality factor G1. This furthermore means that, if the output voltage U of the battery 111 is less than a desired output voltage Us of the battery 111 during a charging process of the battery 111, a value has been estimated for the average first quality factor G1 which is less than the actual value of the average first quality factor G1, and that, if the output voltage U of the battery 111 is greater than a desired output voltage Us of the battery 111 during a charging process of the battery 111, a value has been estimated for the average first quality factor G1 which is greater than the actual value of the average first quality factor G1.

Consequently, the value for the average first quality factor G1 can be approximated iteratively to the real value of the average first quality factor G1 during a discharging process of the battery 111 according to the rules indicated in the relations (6) and (7) and during a charging process of the battery 111 according to the rules indicated in the relations (8) and (9).

If the output voltage U of the battery 111 is less than the desired output voltage Us of the battery 11 during a discharging process of the battery 111, the estimated value for the average first quality factor G1 is reduced, and, (6) if the output voltage U of the battery is greater than the desired output voltage Us of the battery 111 during a discharging process of the battery 111, the estimated value for the average first quality factor G1 is increased. (7)

If the output voltage U of the battery 111 is less than the desired output voltage Us of the battery 11 during a charging process of the battery 111, the estimated value for the average first quality factor G1 is increased, and, (8) if the output voltage U of the battery is greater than the desired output voltage Us of the battery 111 during a charging process of the battery 111, the estimated value for the average first quality factor G1 is reduced. (9)

No instantaneous values of the corresponding voltages, but rather average values of the corresponding voltages occurring over a plurality of control cycles or statistical mean values of the corresponding voltages are preferably used for the output voltage U of the battery 111 and for the desired output voltage Us of the battery 111.

Along with the preceding written disclosure, reference is additionally made to the illustration in FIG. 2 for the further disclosure of the invention.

The invention claimed is:

1. A method for connecting a plurality of battery cells (21) of a battery (111) designed as an electrochemical energy store, wherein the battery cells (21) are electrically coupled to the battery (111) in each case with a corresponding first probability P1i and are electrically decoupled from the battery (111) in each case with a corresponding second probability P2i, and wherein the battery cells (21) are interconnectable in series, characterized in that a first quality factor G1i is calculated for each battery cell (21) depending on a state of charge LZi and on a state of health AZi of the corresponding battery cell (21), an average first quality factor G1 which corresponds to an average value of the first quality factors G1i of the battery cells (21) is defined and a second quality factor G2i is also calculated for each battery cell (21) as a linear function of a difference between the first quality factor (G1i) of the corresponding battery cell (21) and the average first quality factor G1, wherein the corresponding first probability P1i and the corresponding second probability P2i are defined in each case for each battery cell (21) depending on the calculated second quality factor G2i of the corresponding battery cell (21).

2. The method as claimed in claim 1, wherein the second quality factor G2i is defined for each battery cell (21) according to the following relation:

$$G2i=((G1i-G1)/C)+0.5,$$

wherein C is a positive constant, $0 \leq G1i \leq 1$, $0 \leq G1 \leq 1$ and $0 \leq G2i \leq 1$, and wherein i is a natural number between 1 and a number n of the battery cells (21) of the battery (111), G2i is the second quality factor of the i-th battery cell, G1i is the first quality factor of the corresponding i-th battery cell and G1 is the average first quality factor which corresponds to the average value of the first quality factors of the battery cells (21) of the battery (111).

3. The method as claimed in claim 1, wherein, during a discharging process of the battery (111), the corresponding first probability P1i for each battery cell (21) is a linear, monotonically increasing function of the second quality factor G2i of the corresponding battery cell (21) and the corresponding second probability P2i for each battery cell (21) is a linear, monotonically decreasing function of the second quality factor G2i of the corresponding battery cell.

4. The method as claimed in claim 1, wherein, in order to define the average first quality factor G1, the average value of the first quality factors G1i of the battery cells (21) is calculated directly from the values of the first quality factors G1i of the battery cells (21) and/or, in order to define the average quality factor G1, the average value of the first quality factors G1i of the battery cells (21) is specified in order to generate a desired output voltage Us of the battery (111), an existing output voltage (U) of the battery (111) is measured, in the presence of an existing output voltage (U) which is less than the desired output voltage Us.

5. The method as claimed in claim 1, wherein, for each battery cell (21), a first control parameter P1 scaled with a first factor f1i is used as the corresponding first probability P1i and a second control parameter P2 scaled with a second scaling factor f2i is used as the corresponding second probability P2i, wherein the first control parameter P1 and the second control parameter P2 are in each case independent from the first quality factor G1i of the corresponding battery cell (21) and from the second quality factor G2i of the corresponding battery cell (21), and the first factor f1i and the second factor f2i are predefined in each case depending on the second quality factor G2i of the corresponding battery cell (21).

6. The method as claimed in claim 5, wherein, for each battery cell (21), the sum of the corresponding first factor f1i and the corresponding second factor f2i is equal to 1.

7. The method as claimed in claim 5, wherein the same first control parameter P1 and the same second control parameter P2 are used for all battery cells (21).

8. The method as claimed in claim 7, wherein the first control parameter P1 and the second control parameter P2 are specified in order to generate a desired output voltage Us of the battery (111) and an existing output voltage (U) of the battery (111) is measured and compared with the desired output voltage Us of the battery (111) and, if there is a difference between the existing output voltage (U) and the desired output voltage Us, the first control parameter P1 and the second control parameter P2 are modified in such a way that the amount of the difference between the existing output voltage (U) and the desired output voltage Us is minimized.

9. The method as claimed in claim 1, wherein, during a charging process of the battery (111), the corresponding first probability P1i for each battery cell (21) is a linear, monotonically decreasing function of the second quality factor of the corresponding battery cell (21) and the corresponding second probability P2i for each battery cell (21) is a linear, monotonically increasing function of the second quality factor G2i of the corresponding battery cell (21).

10. The method as claimed in claim 5, wherein, for each battery cell (21), the corresponding first factor f1i is equal to the second quality factor G2i of the corresponding battery cell (21) during a discharging process of the battery and, for each battery cell (21), the corresponding second factor f2i is equal to the second quality factor G2i of the corresponding battery cell (21) during a charging process of the battery.

11. A battery system (100) with a battery (111) designed as an electrochemical energy store with a plurality of battery cell units (120) which in each case comprise a battery cell (21) and a battery cell monitoring module (122) allocated to the battery cell (21), wherein each battery cell monitoring module (122) is designed to couple the allocated battery cell (21) electrically to the battery (111) with a corresponding first probability P1i and decouple it electrically from the battery (111) with a corresponding second probability P2i, and wherein the battery cells (21) are interconnectable in series by means of the allocated battery cell monitoring modules (122), characterized in that each battery cell monitoring module (122) is furthermore designed to calculate a first quality factor G1i of the allocated battery cell (21) depending on a state of charge LZi and a state of health AZi of the corresponding battery cell (21), and the battery system (100) comprises a central control unit (30) which is designed to define an average first quality factor G1 which corresponds to an average value of the first quality factors G1i of the battery cells (21) and to transmit it to each battery cell monitoring module (122), wherein each battery cell monitoring module (122) is furthermore also designed to calculate a second quality factor G2i of the allocated battery cell (21) as a linear function of a difference between the first quality factor G1i of the corresponding battery cell (21) and the average first quality factor G1 and to define the corresponding first probability P1i and the corresponding second probability P2i in each case depending on the calculated second quality factor G2i of the allocated battery cell (21).

12. The battery system (100) as claimed in claim 11, wherein each battery cell monitoring module (122) is furthermore designed, during a discharging process of the battery (111), to use a linear, monotonically increasing function of the second quality factor G2i of the allocated battery cell (21) as the corresponding first probability P1i and a linear, monotonically decreasing function of the second quality factor G2i of the allocated battery cell (21) as the corresponding second probability P1i.

13. The battery system (100) as claimed in claim 11, wherein each battery cell monitoring module (122) is furthermore designed to transmit the calculated first quality factor G1i for the allocated battery cell (21) to the central control unit (30) and the central control unit (30) is designed, in order to define the average quality factor G1, to calculate the average value of the first quality factors G1i of the battery cells (21) directly from the values of the first quality factors G1i of the battery cells (21) and/or, in order to define the average first quality factor G1, to specify the average value of the first quality factors G1i of the battery cells (21) in order to generate a desired output voltage Us of the battery (111) and to measure an existing output voltage (U) of the battery (111), in the presence of an existing output voltage U which is less than the desired output voltage Us, to reduce the average value of the first quality factors G1i of the battery cells (21) during a discharging process of the battery (111) and/or to increase it during a charging process of the battery (111) and/or, in the presence of an existing output voltage U which is greater than the desired output voltage Us, to increase the average value of the first quality factors G1i of the battery cells (21) during a discharging process of the battery (111) and/or reduce it during a charging process of the battery (111).

14. The battery system (100) as claimed in claim 11, wherein each battery cell monitoring module (122) is furthermore designed to use a first control parameter P1 scaled with a first factor f1i as the corresponding first probability P1i and a second control parameter P2 scaled with a second scaling factor f2i as the corresponding second probability P2i, wherein the first control parameter P1 and the second control parameter P2 are in each case independent from the first quality factor G1i of the corresponding battery cell (21) and from the second quality factor G2i of the corresponding battery cell (21) and the first factor f1i and the second factor f2i are predefined in each case depending on the second quality factor G2i of the corresponding battery cell (21).

15. The battery system (100) as claimed in claim 11, having a central control unit (30) which is designed, in order to generate a desired output voltage Us of the battery (100), to specify a single first control parameter P1 and a single second control parameter P2 for all battery cells (21), to transmit the first control parameter P1 and the second control parameter P2 to all battery cell monitoring modules (122).

16. The battery system (100) as claimed in claim 15, wherein the central control unit (30) is designed to measure an existing output voltage (U) of the battery (111) and compare it with the desired output voltage Us of the battery (111), and, if there is a difference between the existing output voltage (U) and the desired output voltage Us, to modify the first control parameter P1 and the second control parameter P2 in such a way that the amount of the difference between the current output voltage (U) and the desired output voltage Us is minimized.

17. The battery system (100) as claimed in claim 11, wherein each battery cell monitoring module (122) is furthermore designed to use, during a charging process of the battery (111), a linear, monotonically decreasing function of the second quality factor G2i of the allocated battery cell (21) as the corresponding first probability P1i and a linear, monotonically increasing function of the second quality factor G2i of the allocated battery cell (21) as the corresponding second probability P2i.

* * * * *